United States Patent [19]

Blion

[11] Patent Number: 4,498,600

[45] Date of Patent: Feb. 12, 1985

[54] FILLER CAP HAVING A HINGED COVER

[75] Inventor: Didier Blion, Le Chesnay, France

[73] Assignees: Automobiles Citroen, Neuilly s/Seine; Automobiles Peugeot, Paris, both of France

[21] Appl. No.: 497,763

[22] Filed: May 24, 1983

[30] Foreign Application Priority Data

May 25, 1982 [FR] France .................................. 82 09316

[51] Int. Cl.³ .............................................. B65D 51/18
[52] U.S. Cl. .................................... 220/255; 220/259; 220/306; 220/DIG. 33
[58] Field of Search ............... 220/210, 255, 256, 258, 220/259, 306, DIG. 33; 70/159, 160, 167, 171, 422

[56] References Cited

U.S. PATENT DOCUMENTS 4,164,302 8/1979 Gerdes ................................. 220/210
4,177,931 12/1979 Evans ......................... 220/DIG. 33

FOREIGN PATENT DOCUMENTS 523095 10/1953 France .................................. 70/159

*Primary Examiner*—George T. Hall
*Attorney, Agent, or Firm*—Karl F. Ross; Herbert Dubno

[57] ABSTRACT

This invention relates to a filler cap, particularly for automobile vehicle gas tanks, which comprises a hinged flap coupled with a lockable closing element, wherein the flap and the closing element are coupled together in such a manner as to give way when an effort exerted on the flap reaches a certain threshold.

7 Claims, 2 Drawing Figures

FILLER CAP HAVING A HINGED COVER

FIELD OF THE INVENTION

The present invention relates to filler caps, particularly for automobile vehicle gas tanks, which comprise a hinged flap coupled with a lockable closing element.

BACKGROUND OF THE INVENTION

Attempts are frequently made to break open filler caps which protect access to the gas filling pipes in automobiles. As the flap is integral with the closing element in the caps manufactured at present, these attempts cause deterioration of this flap even if they are unsuccessful.

SUMMARY OF THE INVENTION

It is an object of the present invention to provide an improved filler cap which overcomes this drawback.

The filler cap according to the invention is characterized in that the flap and the closing element are coupled in such a manner as to give way when an effort exerted on the flap reaches a certain threshold.

Under these conditions, in the event of attempted break-in, any deterioration of the flap is avoided. The presence of the closing element which is intact and still locked, after the flap has been opened, has a dissuasive effect. Finally, it is much more difficult to break the closing element separated from the flap which exerted thereon a lever effect.

In an advantageous embodiment of the invention, the flap is fast with at least two flexible tongues which are directed inwardly of the cap and whose ends comprise retaining hooks adapted to clip on the closing element.

BRIEF DESCRIPTION OF THE DRAWING

The invention will be more readily understood on reading the following description with reference to the accompanying drawing, in which.

SPECIFIC DESCRIPTION

Figure 1:
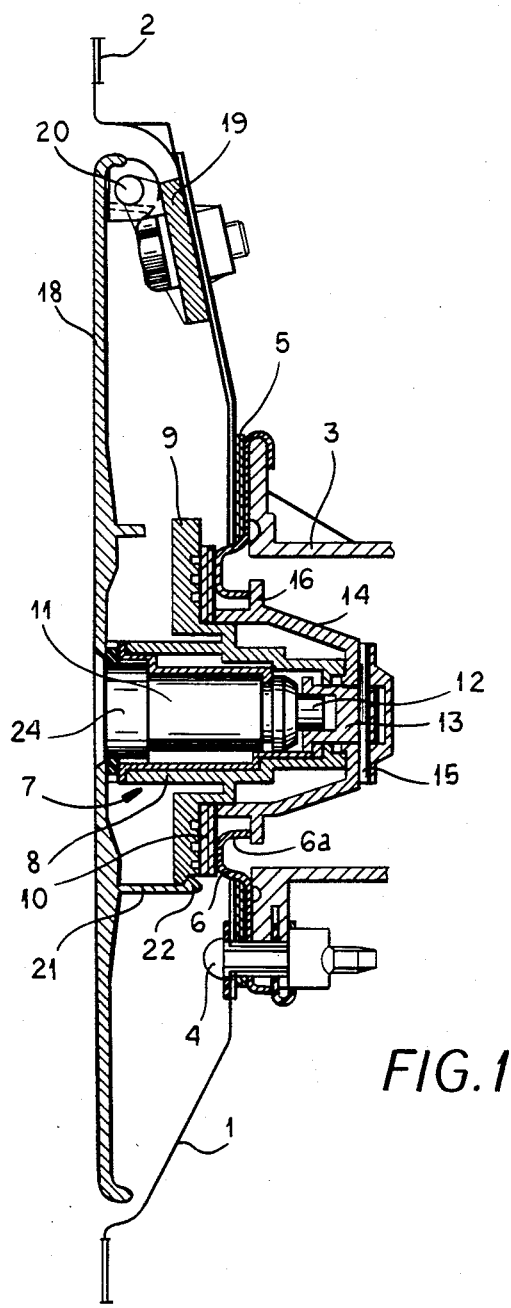
FIG. 1 is a section of the cap along I—I of FIG. 2.
Figure 2:
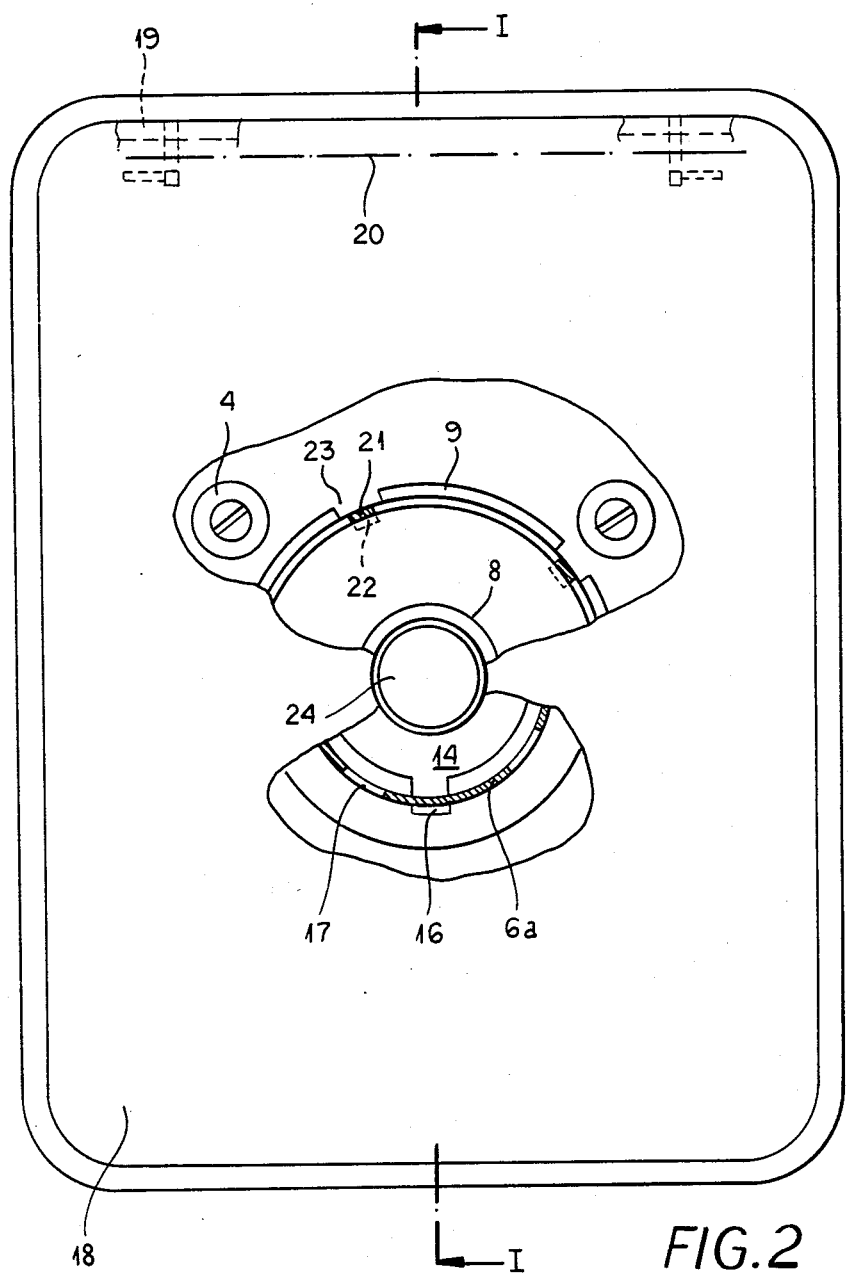
FIG. 2 is a plan view thereof with parts broken away.

Referring now to the drawing, the Figures show a filler cap comprising a casing 1 integrated in the bodywork 2. The gas filling pipe 3 is fixed to the casing 1 by bolts 4, via an orifice provided in the bottom of this casing, with the interposition of a gasket 5 and an annular bearing base 6.

The opening in the base 6 may be obturated by a closing element or stopper 7 comprising a central cylinder 8 fast with a peripheral flange 9 which may abut on the base 6 with the interposition of a gasket 10. Inside the cylinder 8 is disposed a locking plug 11 whose mobile element 12 is fast with a drive socket 13 partially disposed inside the cylinder 8. This socket is engaged in a covering turret element 14 and is connected therewith by a pin 15. The periphery of the turret element 14 comprises studs 16 adapted to pass through notches 17 provided in the base 6 and to engage beneath a turned down collar 6a of this base.

A flap 18 is connected to the casing 1 by a hinge 19 whose pivot pin is shown at 20. The flap 18 bears a series of flexible tongues 21 which are directed inwardly, perpendicularly to the plane of the flap; the end of each of these tongues constitutes a retaining hook 22 directed radially and inwardly and adapted to clip behind a projection provided on the peripheral edge of the bottom of notches 23 made in the flange 9 and in which the tongues are engaged. The tongues may be integral with the flap or be connected therewith.

The flap 18 is provided at its center with a hole 24 in register with the plug 11, allowing a control means, constituted for example by a key, to be introduced into said plug.

Normally, the flap is coupled to the closing element 7. After the tank has been filled, the assembly is pivoted down into the casing and locked in conventional manner. With the aid of the key introduced into the plug 11 via opening 24, the element 12 of the lock is rotated, which in turn rotates the turret element 14. The studs 16 of this turret element which have engaged in the notches 17, come into abutment beneath the turned down collar 6a of the base 6, compressing the gasket 10 which ensures seal.

If, when the filler cap is locked, a force is exerted on the flap 18 to open the cap, the flap becomes disconnected from the closing element 7 which remains in position of closure on the base 6. Neither the flap nor the closing element are damaged.

It will be noted that the highly enveloping form of the turret element 14 makes it possible to obtain considerable axial compactness. A very flat casing 1 may consequently be provided, made by direct stamping on the bodywork, which avoids having to make and fix an added element.

What is claimed is:

1. In a filler cap, particularly for automobile vehicle gas tanks, which comprises a hinged flap coupled with a lockable closing element, the flat and the closing element being coupled together in such a manner as to give way when an effort exerted on the flap reaches a certain threshold, said flap being fast with at least two flexible tongues directed inwardly of the cap and whose ends comprise retaining hooks adapted to clip on the closing element.

2. The filler cap of claim 1, wherein the tongues are substantially perpendicular to the plane of the flap.

3. The filler cap of claim 1, wherein the hooks of the tongues engage beneath a peripheral flange of the closing element.

4. The filler cap of claim 1, wherein the tongues engage inside notches made in a peripheral flange of the closing element.

5. The filler cap of claim 1, wherein the hooks are directed radially and inwardly.

6. A filler cap assembly for an automotive vehicle having a body and a filler pipe opening at a region of said body, said assembly comprising:
   a flap hinged to said body at a location spaced from the opening of said pipe at said body whereby said flap is swingable from a position in which said flap covers said opening to a position in which said flap exposes said opening;
   a closure member receivable in said opening for sealing same; and
   retaining means normally securing said closure member and said flap for swinging movement therewith but adapted to release said closure member upon forcible attack on said flap to enable said flap to swing away from said closure member without damage to said closure member or said flap upon a force exerted upon said flap in excess of a certain threshold value.

7. The assembly defined in claim 6 wherein said closure member is rotatable relative to said flap and is provided with a rotatably locking connection in said opening.

* * * * *